United States Patent [19]
Husting

[11] Patent Number: 4,945,579
[45] Date of Patent: Aug. 7, 1990

[54] DRAIN VALVE ACTIVATOR ASSEMBLY

[75] Inventor: Thomas J. Husting, Sheboygan Falls, Wis.

[73] Assignee: Kohler Company

[21] Appl. No.: 330,838

[22] Filed: Mar. 30, 1989

[51] Int. Cl.$^5$ .................. E03C 1/22; E03C 1/232
[52] U.S. Cl. .......................... 4/203; 4/204; 4/199; 251/68
[58] Field of Search ............ 4/198, 199, 200, 204, 4/203, 406, 201, 202; 251/66, 68, 74

[56] References Cited

U.S. PATENT DOCUMENTS

| | | | |
|---|---|---|---|
| 1,002,591 | 9/1911 | Lecuyer | 251/260 |
| 1,014,669 | 1/1912 | Raymaker | 251/68 |
| 1,065,521 | 6/1913 | Gorman | 251/336 |
| 1,501,303 | 7/1924 | Berry | 251/70 |
| 1,924,251 | 8/1933 | McGuire | 251/68 |
| 2,333,370 | 11/1943 | Graham | 74/2 |
| 3,461,894 | 8/1969 | MacLennan | 251/68 |
| 3,995,651 | 12/1976 | Adams | 137/38 |
| 4,042,984 | 8/1977 | Butler | 4/200 |
| 4,659,063 | 4/1987 | Veillette et al. | 251/68 |
| 4,744,108 | 5/1988 | Schmidt | 4/199 |
| 4,796,310 | 1/1989 | Freville et al. | 4/199 |

FOREIGN PATENT DOCUMENTS 532979 9/1955 Italy ........................... 251/68

OTHER PUBLICATIONS

Pp. 3–43 of the 1986 Kohler "K-400 Catalog".
P. 7 of the 1987 Kohler brochure "Autofill Bath System".

Primary Examiner—Henry J. Recla
Assistant Examiner—Edward C. Donovan

[57] ABSTRACT

A drain valve activator assembly for a container such as a bathtub is disclosed. In one embodiment, there is an overflow plate mountable on a side wall of the tub at the overflow outlet. A stem is positioned through the plate so as to rotate on its own longitudinal axis, so as to have one end extending into the bathtub, and so as to have one end extending out of the bathtub. A solenoid is provided outside the tub with a holding member such as a leaf spring. Upon activation, the solenoid pulls the leaf spring away from the stem. Normally, the leaf spring is biased towards the stem. The holding member and a stem end are configured so as to be able to interfit and inhibit stem rotation when the leaf spring abuts against the stem. A torsion spring stores the rotational energy used to manually open the valve, and then uses that energy to drive the valve to the closed position in response to the solenoid operation.

7 Claims, 2 Drawing Sheets

DRAIN VALVE ACTIVATOR ASSEMBLY

This invention relates to systems for operating drain valves for bathtubs and other fluid bearing containers. More particularly, it relates to a system that permits drain valves to be operated both manually and by an electric control system.

BACKGROUND OF THE INVENTION

There have been some prior automated bathtub drain valves. See e.g. U.S. Pat. Nos. 1,501,303, 1,924,251, 3,995,651 and 4,042,984. However, valves of this type usually suffer from one or more of the following deficiencies: (1) they cannot be overridden manually (e.g. in case of a power failure or the preference of a particular user is to rely on a manually activated system); (2) they do not permit easy access to the various linkages that connect to the drain valve in order to permit adjustment, installation, or cleaning; and/or 3) they are overly expensive to manufacture, install, or repair. In recent years, some hydraulically activated systems have been developed. While these systems have solved some of the problems, other problems still remain.

Thus, it can be seen that a need exists for an improved automatic drain valve.

SUMMARY OF THE INVENTION

In one aspect, the invention provides a drain valve activator assembly for a container having a drain outlet. A housing is mountable adjacent to a wall of the container (e.g. on an interior wall of a bathtub at the overflow hole) and a stem is positionable in the housing so as to be able to rotate about its own longitudinal axis and so as to have an end that extends outside of the container (e.g. into the overflow pipe).

There is also provided a solenoid and a holding member. The holding member can be moved away from the stem in response to activation of the solenoid. There are also means for moving the holding member towards the stem (e.g. the holding member can be resiliently biased towards a radially outward edge of the stem).

The holding member and a portion of the outside stem end are configured so as to interfit with each other and thereby inhibit stem rotation when they do interfit (e.g. a cam and detent coupling). Resilient means (e.g. a torsion spring) can be coupled to the stem so as to be tensioned by rotation of the stem around its longitudinal axis in one direction, and so that the resilient means can drive stem rotation in the opposite direction in at least some circumstances when the interfitting of the holding member and the stem end is not occurring.

In another form of the invention, there are means connectable to the stem to translate its rotary motion to drain valve movement, and the stem is formed with a cam wheel at the stem's outer end. The cam wheel has a radially outward pocket for trapping the holding member. The holding member can be resiliently biased towards the pocket.

In yet another form, the torsion spring is wrapped around the stem, is attached at one end to the stem, and is attached at the other end to the housing. Activation of the solenoid causes magnetic force to move the holding member away from the stem, thus permitting the stem to rotate in response to the torsion spring. The stem may also be rotated in response to manual force in either the clockwise or counter-clockwise direction, notwithstanding any interfitting of the holding member with the stem. When one manually turns the handle one way to open the valve, this pre-tensions the spring. Immediate unwinding is prevented by the detent/pocket system.

It will be appreciated from the disclosure below that the stem may be rotated between a "valve open" position and a "valve closed" position by rotating a handle attached to the stem. A lift rod, a rocker assembly, and other connections translate the rotary motion of the stem to appropriate movement of the drain valve.

The system saves up the energy of the manual opening to assist in the closing operation. Since most of the energy required to open the valve is supplied by the actuator, and not by the solenoid, a relatively low voltage solenoid can be used.

Also, a solenoid can be used that has a relatively short stroke, as the solenoid need only lift the detent spring a very short way. (The valve itself is not directly moved by the solenoid.) As such, a very inexpensive solenoid may be used.

The system can easily be installed and can easily be removed in the event that the user wishes to remove trapped hair or other matter from the overflow tube. Also, the various components of the invention are inexpensive to produce.

Accordingly, the objects of the invention include:

(a) providing a drain valve activator assembly of the above kind in which the energy used to manually open the valve is stored for use in assisting the automatic closure of the valve;

(b) providing a drain valve activator assembly of the above kind that may be manually opened or closed by a user, and may be electrically closed;

(c) providing a drain valve activator assembly of the above kind, in which a low voltage solenoid can be used; and (d) providing a drain valve activator assembly of the above kind that is inexpensive to produce, install, and repair.

These and other objects and advantages of the present invention will be apparent from the description which follows. In the description, reference will be made to the accompanying drawings which form a part hereof. The drawings show, by way of illustration, preferred embodiments of the invention. Such embodiments do not represent the full scope of the invention. Reference should therefore be made to the claims herein for interpreting the scope of the invention. cl DESCRIPTION OF THE DRAWINGS FIG. 1 is a fragmented view, in partial vertical section, of an embodiment of the present invention mounted together with a bathtub;

DESCRIPTION OF THE PREFERRED EMBODIMENTS

Figure 3:
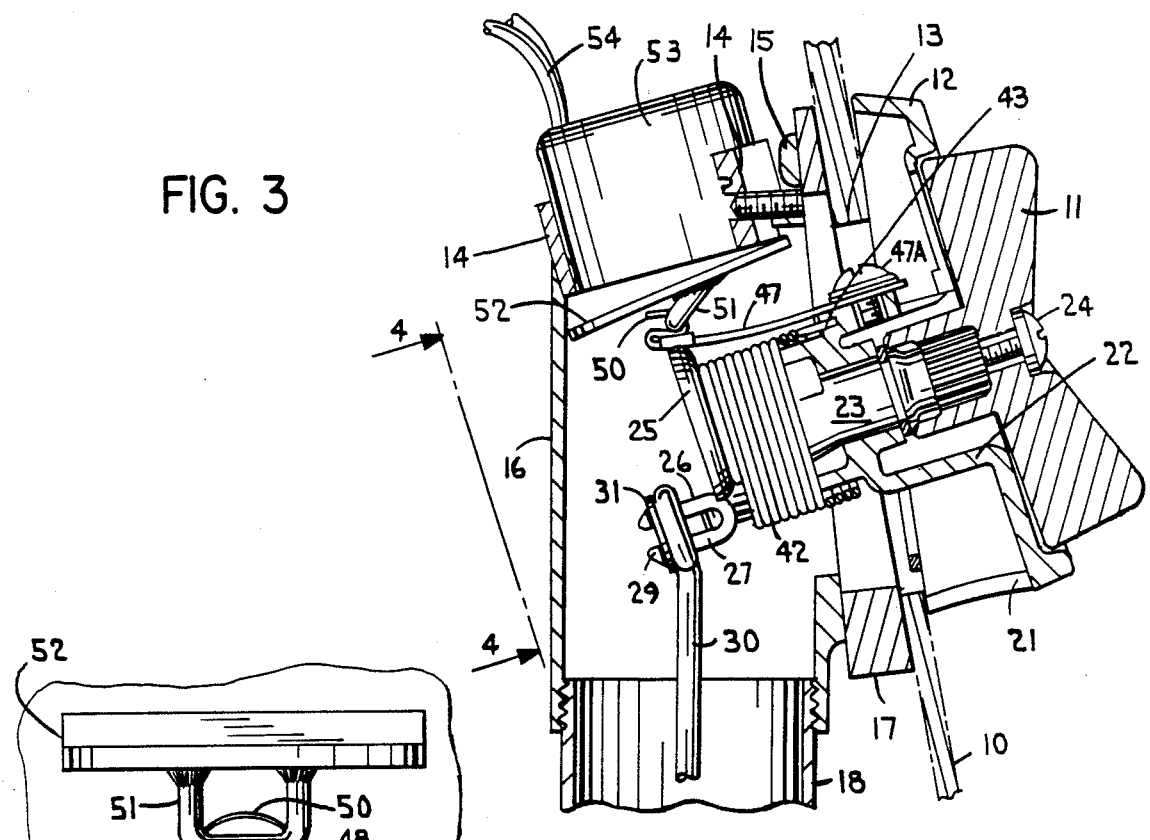
FIG. 3 is an enlarged vertical sectional view of the assembly.

Referring now to the drawings, there is shown a bathtub 10. Extending into the interior of the tub is a rotatable handle 11 which is mounted against a stationary overflow hood (or housing) 12. As shown in FIG. 3, the hood 12 covers the usual overflow opening 13 and is attached by screws 14 (only one shown) to a portion 15 of elbow 16. A tapered gasket 17 is positioned between the elbow housing 16 and the outer surface of the bathtub 10 (and is thus sandwiched along with the bathtub 10 between the hood 12 and the elbow 16).

The hood 12 has at its lower edge the usual overflow opening 21 to channel overflow water from the bathtub through the opening 13, into overflow tube 18, and eventually to the sewer via pipe 40.

Integrally formed with the hood 12, and projecting through the opening 13, is a cam shaft support cylinder 22. Cam shaft (or stem) 23 is rotatably supported by the cam shaft support 22. A fluted inward end of the cam shaft 23 mates with corresponding flutes on the handle 11, and screw 24 fits into an axial hole on cam shaft 23 to couple the handle to the shaft. Rotation of handle 11 therefore rotates cam shaft 23.

Figure 1:
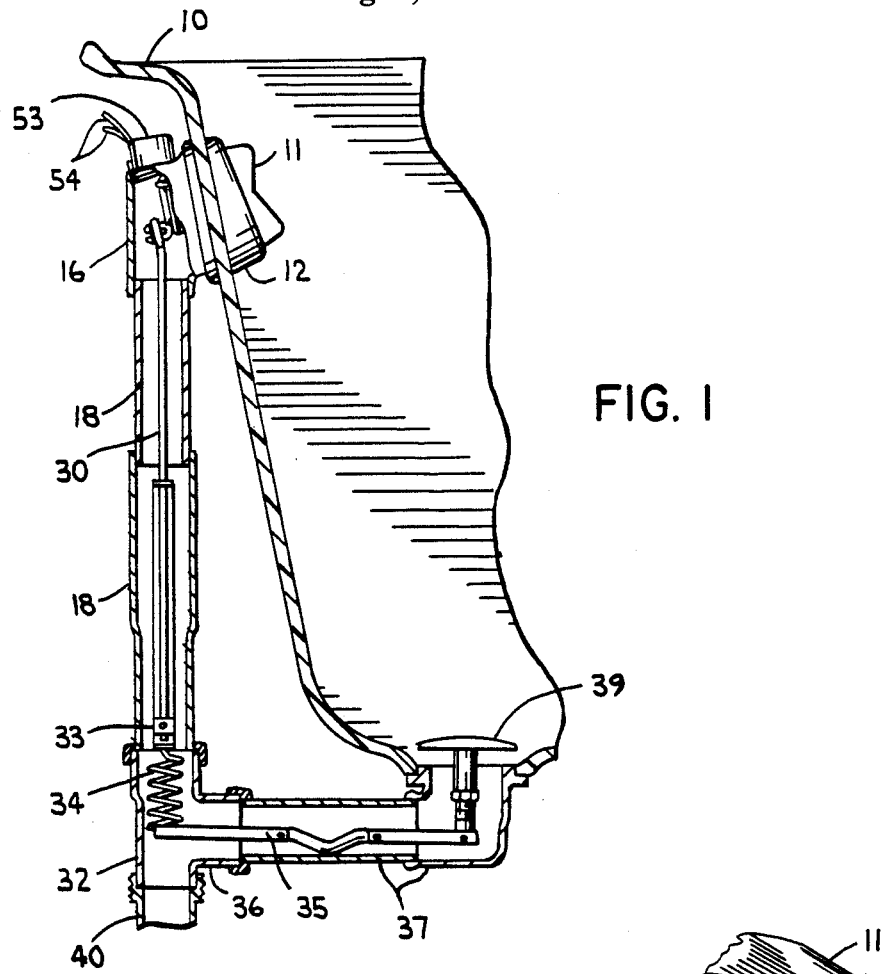
Figure 2:
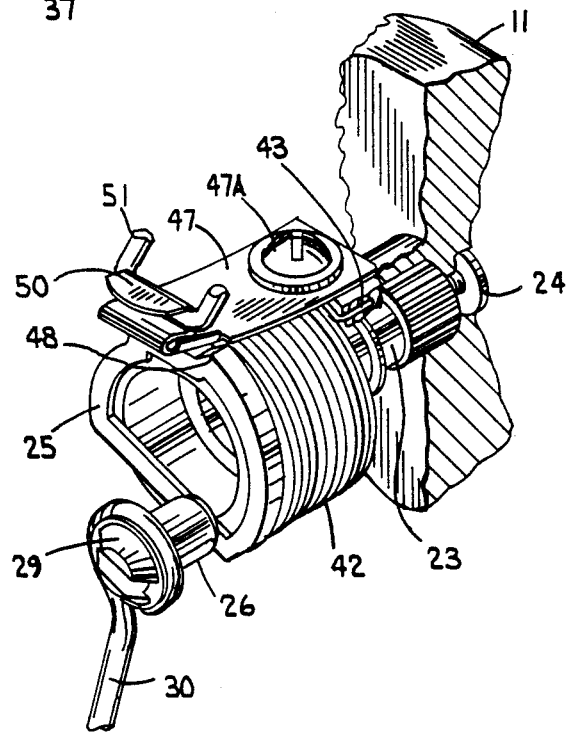
FIG. 2 is an enlarged perspective view of a part of the activator assembly, with the handle partially cut away and the overflow hood removed.
Figure 4:
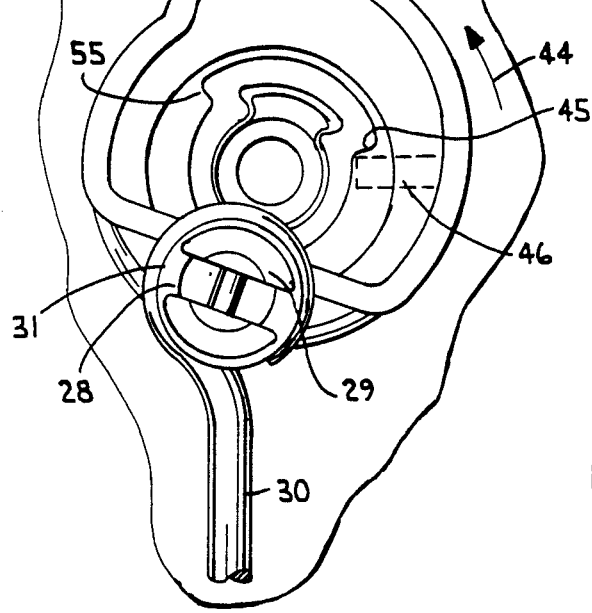
FIG. 4 is a view in elevation taken along lines 4—4 of FIG. 3, with the wall 16 removed.

The outer end of the cam shaft 23 has a cam wheel 25. The cam wheel may be integrally formed with the shaft, or may be separately formed and welded or otherwise attached thereto. Extending further outward from the cam wheel 25 is a crank fork 26. As best seen in FIGS. 2 and 4, the fork has flexible fingers 27 separated by space 28. The shape of heads 29 permit a snap fit assembly to the looped end of a conventional lift rod 30. If desired, a washer 31 can also be positioned over heads 29. It will be appreciated that rotation of the handle 11 rotate the cam wheel 25 and fork 26. This moves the lift rod 30 up and down.

As is well known, a lift rod such as lift rod 30 can extend vertically down a tube 18 to a drain "T" 32. There it can be coupled by an adjustable slide member 33 to a vertically extending engagement spring 34. The spring rides upon an outer end of rocker 35 that extends through the horizontal opening 36 of the drain "T" 32. The rocker also extends into a drain opening "L" 37. Rocker 35 is attached to the bathtub stopper 39 within the vertical extent of the drain "L" 37. Downward movement of spring 34 causes the stopper 39 to rise into the bathtub (permitting the flow of water out from the bathtub through the drain "L", the drain "T", tail piece 40 and the sewer). The upward movement of spring 34 drags the stopper 39 down to the closed position (or in the alternative, can be configured to allow gravity and/or water pressure to close the valve).

Returning now to the invention, and referring to FIG. 2, a torsion spring 42 is wrapped around the cam shaft 23. One end of the spring 42 is affixed to the cam shaft support 21 at 43. The other end is affixed to the cam shaft 23. When the crank fork 26 (and hence the lift rod 30) are in their lowest position (see FIGS. 3 and 4), the stopper 39 is in the open position, and a counter-clockwise, as viewed from the FIG. 4 perspective, torque has already been established by the spring on cam shaft 23 (note arrow 44). Additional clockwise motion of the cam shaft 23 is prevented by rotation stop 45 attached to cam shaft 23 which strikes a rotation stop wall 46 that projects radially inward and is part of the cam shaft support 21.

As is best seen in FIG. 2, to inhibit counter-clockwise motion from the FIG. 3 position in response to spring tension, spring (or holding member) 47 is affixed by a screw 47A to cam shaft support 22. It extends parallel to the longitudinal axis of cam shaft 23. Ears 48 are formed on the outward end of detent spring 47 to permit it to ride smoothly along the upper periphery of the cam wheel 25 (see FIG. 4). In the "valve open" position, torsional force 44 is resisted by the pressure of the detent spring 47 against the surface 49 on the periphery of the cam wheel.

The cam wheel 25 may be rotated to the "valve closed" position (compare FIG. 5) in one of two ways. One way is for handle 11 to be manually turned, to cause the cam wheel 25 to move in a counter-clockwise direction. Note that enough manual force must be used to overcome a moderate level of resistance from the detent spring. Detent slope 49 adjacent to one spring ear 48 forms a trapping pocket, but the slope is such that it will permit manual rotation to drive the detent spring up and out of a blocking position. Once the surface 49 is substantially cleared, spring tension will then rotate the stem 23, and thus drive the rod 30 up. This causes the drain valve to close.

The detent spring may also be lifted (to close the valve 39) by activation of a solenoid. Note that the end of detent spring 47 has a hook 50 on its upper surface which holds onto a trapeze 51 extending from the bottom surface of a ferromagnetic armature plate 52. The armature plate is pivotably suspended below the pole face of 24 volt solenoid 53. A brief activation of the solenoid 53 (by means of an electrical current passed through leads 54), attracts the armature plate 52, thereby drawing the detent spring away from surface 49 of the cam wheel 25. The torsion spring 42 is then able to drive the cam wheel 25 to the "valve closed" position.

Figure 5:
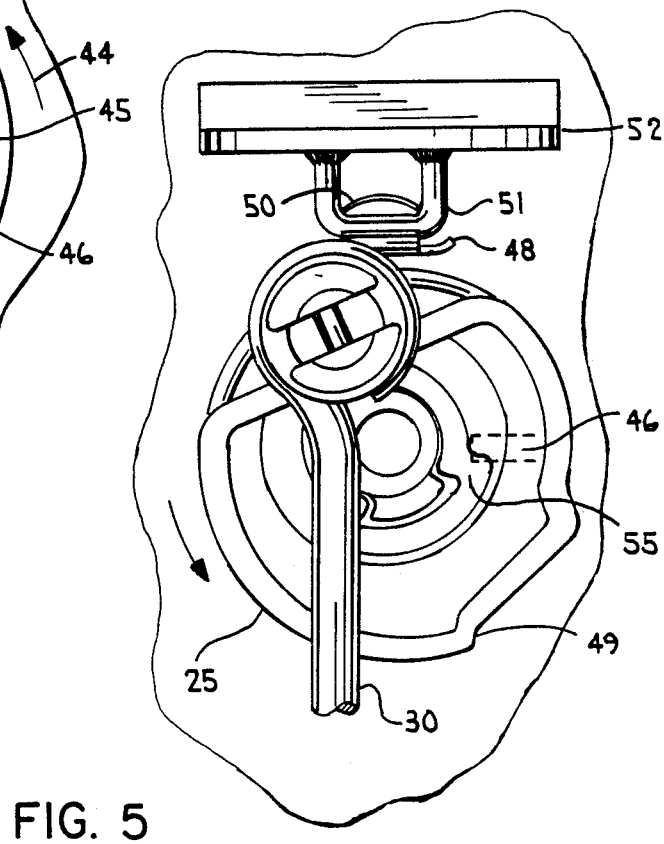
FIG. 5 is a view similar to FIG. 4, but showing the assembly in the "valve closed" position.

Referring to FIG. 5, further counter-clockwise motion of the cam shaft, after reaching the "valve closed" position, is prevented by rotation stop 55 striking stop 46. The cam wheel 23 may be returned to the "open" position by means of clockwise rotation of shaft 23 in response to manual rotation of the handle. This reenergizes the torsion spring.

This system is especially well suited to timer or computer activated tubs where the tub is automatically filled (e.g. a bath is drawn by the time the individual is awakened). In such systems, the user will normally be present when the decision is made to empty the tub. However, the individual may or may not be present when the drain is to be closed so that the tub can be filled.

A preferred embodiment of the invention has been described above. It should be apparent to those skilled in the art that variations can be made without departing from the spirit of the invention. For example, various intermediate linkages can be used in place of trapeze 51 and hook 50 or in place of link rod 30 and the parts below it. Thus, the claims should be looked to assess the full scope of the invention.

I claim:

1. A drain valve activator assembly for a bath tub or the like having a drain outlet, said drain outlet including a valve and operating linkage, the assembly comprising:
   a housing mountable adjacent a wall of the tub or the like;
   a stem positionable in said housing so as to be able to rotate about its own longitudinal axis, and so as to have an end extending outside of the tub or the like;
   a solenoid;
   a holding member movable in response to solenoid activation away from said stem;
   means for moving said holding member towards said stem;
   the holding member and a portion of said outside stem end being configured so as to be able to interfit with each other, and inhibit stem rotation when they do interfit, wherein the stem may be manually moved to release the holding member, notwithstanding any interfitting of the holding member with the stem;

resilient means coupled to said stem that is tensioned by rotation of the stem along its longitudinal axis is one direction, and that drives stem rotation in the opposite direction in at least some circumstances when the interfitting is not occurring; and actuator linkage connected to the stem and movable in response to the rotation of the stem and connectable to the operating linkage to open and close the valve.

2. The drain valve activator assembly of claim 1, wherein a handle is attached to an end of the stem opposite said outside end so as to rotate therewith.

3. The drain valve activator assembly of claim 1, wherein the stem is formed with a cam wheel at said outside extending end, the cam wheel having a radially outward pocket for trapping the holding member.

4. The drain valve activator assembly of claim 3, wherein said holding member is resiliently biased towards said pocket.

5. The drain valve activator assembly of claim 1, wherein the resilient means is a torsion spring that is wrapped around the stem, is attached at one end to the stem, and is attached at the other end to the housing.

6. The drain valve activator of claim 1, wherein magnetic force can cause the holding member to move away from the stem.

7. The drain valve activator assembly of claim 1, wherein the housing has the form of an overflow hole hood.

* * * * *